United States Patent
Sato et al.

(10) Patent No.: US 12,517,920 B1
(45) Date of Patent: Jan. 6, 2026

(54) INFORMATION PROCESSING DEVICE, DATA STRUCTURE, INFORMATION PROCESSING PROGRAM, AND INFORMATION PROCESSING METHOD

(71) Applicant: CHIYODA CORPORATION, Yokohama (JP)

(72) Inventors: Hideki Sato, Yokohama (JP); Shizuka Ikawa, Yokohama (JP); Motoki Irikura, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 18/997,853

(22) PCT Filed: Aug. 5, 2022

(86) PCT No.: PCT/JP2022/030072
§ 371 (c)(1),
(2) Date: Jan. 23, 2025

(87) PCT Pub. No.: WO2024/029064
PCT Pub. Date: Feb. 8, 2024

(51) Int. Cl.
*G06F 16/25* (2019.01)
*G06F 16/28* (2019.01)

(52) U.S. Cl.
CPC .......... *G06F 16/254* (2019.01); *G06F 16/287* (2019.01)

(58) Field of Classification Search
CPC .............................. G06F 16/254; G06F 16/287
See application file for complete search history.

(56) References Cited

U.S. PATENT DOCUMENTS

2005/0027683 A1* 2/2005 Dill .................. G06Q 30/02
2009/0074560 A1* 3/2009 Madison ................ F16C 19/52
415/111

(Continued)

FOREIGN PATENT DOCUMENTS

JP 2007004728 A 1/2007
JP 2007199748 A 8/2007

(Continued)

OTHER PUBLICATIONS

International Search Report issued on Oct. 25, 2022, in corresponding International Application No. PCT/JP2022/030072; 4 pages.

(Continued)

*Primary Examiner* — Etienne P Leroux
(74) *Attorney, Agent, or Firm* — Maier & Maier, PLLC

(57) ABSTRACT

An information processing device, comprising: a first acquisition unit 127; a second acquisition unit 128; and an extraction unit 129, wherein the first acquisition unit 127 acquires a first data set including at least a first process data related to a first process and first system data related to a system where the first process is performed, the second acquisition unit 128 acquires a second data set including at least a second process data related to a second process and second system data related to a system where the second process is performed, and the extraction unit 129 extracts at least one of a pair of the first process data and the second process data whose contents are the same as or similar to each other and a pair of the first system data and the second system data whose contents are the same as or similar to each other from the first data set and the second data set, and stores at least one of the pairs extracted in a storage unit in a manner where their correspondence relationship is identifiable.

10 Claims, 13 Drawing Sheets

(56) References Cited

U.S. PATENT DOCUMENTS

| | | |
|---|---|---|
| 2016/0018796 A1 | 1/2016 | Lu |
| 2022/0222402 A1 | 7/2022 | Okawachi et al. |
| 2022/0229426 A1 | 7/2022 | Nakamura |

FOREIGN PATENT DOCUMENTS

| | | |
|---|---|---|
| JP | 2017091485 A | 5/2017 |
| JP | 2019089907 A | 6/2019 |

OTHER PUBLICATIONS

Office Action issued on Feb. 21, 2023, in corresponding Japanese Application No. 2022-577220; 7 pages.
Decision to Grant a Patent issued on Mar. 28, 2023, in corresponding Japanese Application No. 2022-577220; 5 pages.
Extended Search Report issued on Jul. 28, 2025, in corresponding European Application No. 22954052.1, 9 pages.

* cited by examiner

FIG. 4

| | LAB-SCALE MODEL | BENCH-SCALE MODEL | COMMERCIAL-SCALE MODEL |
|---|---|---|---|
| EFFECT OF REACTION TIME | $\frac{dC_A}{dt} = -(k_{AB} + k_{AC})C_A$<br>$\frac{dC_B}{dt} = k_{AB}C_B$<br>$\frac{dC_C}{dt} = k_{AB}C_C$ | $\frac{dC_A}{dt} = -C_A(k_{AB} + k_{AC})C_A$<br>$\frac{dC_B}{dt} = CAk_{AB}C_B$<br>$\frac{dC_C}{dt} = CAk_{AB}C_C$ | $\frac{dC_A}{dt} = -C_A(k_{AB} + k_{AC})C_A$<br>$\frac{dC_B}{dt} = CAk_{AB}C_B$<br>$\frac{dC_C}{dt} = CAk_{AB}C_C$ |
| EFFECT OF REACTION TIME DISTRIBUTION | BATCH-TYPE | CSTR_5-STAGE TYPE | CSTR_10-STAGE TYPE |
| EFFECT OF REACTION TEMPERATURE | $k_{xx} = k'_{xx} \exp\left(-\frac{Ea}{RT}\right)$ | $k_{xx} = k'_{xx} \exp\left(-\frac{Ea}{RT}\right)$ | $k_{xx} = k'_{xx} \exp\left(-\frac{Ea}{RT}\right)$ |
| EFFECT OF REACTION PRESSURE | NO NEED TO CONSIDER DUE TO LIQUID-PHASE REACTION | NO NEED TO CONSIDER DUE TO LIQUID-PHASE REACTION | NO NEED TO CONSIDER DUE TO LIQUID-PHASE REACTION |
| EFFECT OF REACTION PRESSURE | NO NEED TO CONSIDER BECAUSE CATALYST IS USED FOR SHORT TIME. | $CA = CA_0 \exp(-k_a t)$ | $CA = CA_0 \exp(-k_a t)$ |
| EFFECT OF MATERIAL DIFFUSION | NO NEED TO CONSIDER BECAUSE IT IS COMPLETE MIXING LAYER | $k_{xx} = 4\pi a D_A$ | NO NEED TO CONSIDER IN MAIN OPERATION RANGE |

FIG. 5

| LAB-SCALE MODEL | BENCH-SCALE MODEL | COMMERCIAL-SCALE MODEL |
| --- | --- | --- |
| SEPARATING A PLURALITY OF BOILING POINT FRACTIONS IN SINGLE POT | USING A PLURALITY OF STAGES, TEMPERATURE AND PRESSURE ARE DIFFERENT AT EACH STAGE | USING A PLURALITY OF STAGES, TEMPERATURE AND PRESSURE ARE DIFFERENT AT EACH STAGE |
| (BOILING POINT FRACTION; TEMPERATURE CHANGE REQUIRED) | (Feed → BOILING POINT FRACTION / BOILING POINT FRACTION / BOILING POINT FRACTION / BOILING POINT FRACTION) | (Feed → BOILING POINT FRACTION / BOILING POINT FRACTION / BOILING POINT FRACTION / BOILING POINT FRACTION) |
| CALCULATION OF CHEMICAL EQUILIBRIUM MODEL CHANGES ACCORDING TO INTERNAL TEMPERATURE (WHICH CHANGES OVER TIME) | CALCULATION FOR CHEMICAL EQUILIBRIUM MODEL EXISTS AT EACH STAGE | CALCULATION FOR CHEMICAL EQUILIBRIUM MODEL EXISTS AT EACH STAGE |

FIG. 12
| TIME | PROCESSING AMOUNT | TEMPERATURE | PRESSURE |
|---|---|---|---|
|  |  |  |  |
|  |  |  |  |
|  |  |  |  |
LAB-SCALE
DATA A (CATALYST A)
| TIME | PROCESSING AMOUNT | TEMPERATURE | PRESSURE |
|---|---|---|---|
|  |  |  |  |
|  |  |  |  |
|  |  |  |  |
LAB-SCALE
DATA B (CATALYST B)
| TIME | PROCESSING AMOUNT | TEMPERATURE | PRESSURE |
|---|---|---|---|
|  |  |  |  |
|  |  |  |  |
|  |  |  |  |
BENCH-SCALE
DATA A (CATALYST A)
PROCESSING AMOUNT
DATA GROUP
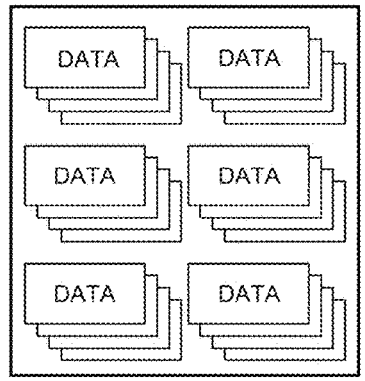
TEMPERATURE
DATA GROUP
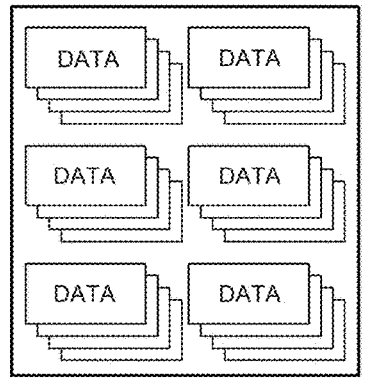
PRESSURE
DATA GROUP
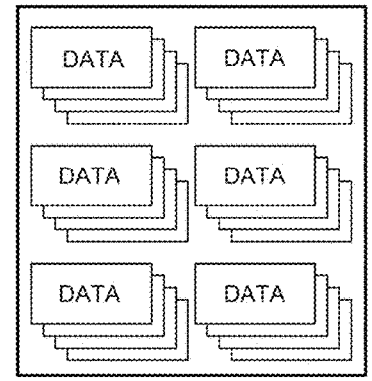

INFORMATION PROCESSING DEVICE, DATA STRUCTURE, INFORMATION PROCESSING PROGRAM, AND INFORMATION PROCESSING METHOD

TECHNICAL FIELD

The present invention relates to an information processing device, a data structure, an information processing program, and an information processing method for processing information for a design of a plant.

BACKGROUND ART

When constructing a large-scale plant, a design is performed in stages, starting with small scale, then medium scale, and finally large scale. First, a system for performing a process on a small scale is designed, and the process is performed in an assembled small-scale system. Based on information obtained at this time, a predictive model is constructed to predict the process in the small-scale system. This predictive model is used to consider an equipment configuration, an equipment size, an operation policy, etc. for a next-scale system, and the next-scale system is designed. This consideration is repeated in stages to finally design a commercial-scale plant.

CITATION LIST

Patent Literature

[Patent Literature 1] JP-A-2019-89907

SUMMARY OF INVENTION

Technical Problem

In order to perform this consideration, it is necessary to create predictive models at each scale and then tune the predictive models. This requires a lot of time and cost, which ultimately slows down a speed of development.

The present invention has been made in view of the above circumstances, and has an object to provide a technique for assisting a design of a plant.

Solution to Problem

In order to solve the above problem, an information processing device of one aspect of the present invention comprises: a first acquisition unit; a second acquisition unit; and an extraction unit, wherein the first acquisition unit acquires a first data set including at least a first process data related to a first process and a first system data related to a system where the first process is performed, the second acquisition unit acquires a second data set including at least a second process data related to a second process and a second system data related to a system where the second process is performed, and the extraction unit extracts at least one of a pair of the first process data and the second process data whose contents are the same as or similar to each other and a pair of the first system data and the second system data whose contents are the same as or similar to each other from the first data set and the second data set, and stores at least one of the pairs extracted in a storage unit in a manner where their correspondence relationship is identifiable.

Another aspect of the present invention is a data structure. This data structure including: a first data set; and a second data set. The first data set includes at least a first process data related to a first process and a first system data related to a system where the first process is performed. The second data set includes at least a second process data related to a second process and a second system data related to a system where the second process is performed. And the data structure stores a pair of the first process data and the second process data whose contents are the same as or similar to each other, or a pair of the first system data and the second system data whose contents are the same as or similar to each other in a manner where their correspondence relationship is identifiable.

Another aspect of the present invention is an information processing method. This information processing method comprises steps of: acquiring a first data set including at least a first process data related to a first process and a first system data related to a system where the first process is performed, acquiring a second data set including at least a second process data related to a second process and a second system data related to a system where the second process is performed, and extracting at least one of a pair of the first process data and the second process data whose contents are the same as or similar to each other and a pair of the first system data and the second system data whose contents are the same as or similar to each other from the first data set and the second data set, and storing at least one of the pairs extracted in a storage unit in a manner where their correspondence relationship is identifiable.

In addition, any combination of the above components, and any conversion of the expression of the present invention into method, device, system, recording media, computer program, etc., are also valid as aspects of the present invention.

According to the present invention, a technique for assisting a design of a plant can be provided.

BRIEF DESCRIPTION OF DRAWINGS

FIG. 4 is a diagram showing a specific example of an assistance method according to the first embodiment.

FIG. 5 is a diagram showing another specific example of an assistance method according to the first embodiment.

FIG. 12 is a diagram showing another example of the data structure of the performance data holding unit.

DESCRIPTION OF EMBODIMENTS

First Embodiment

Figure 1:
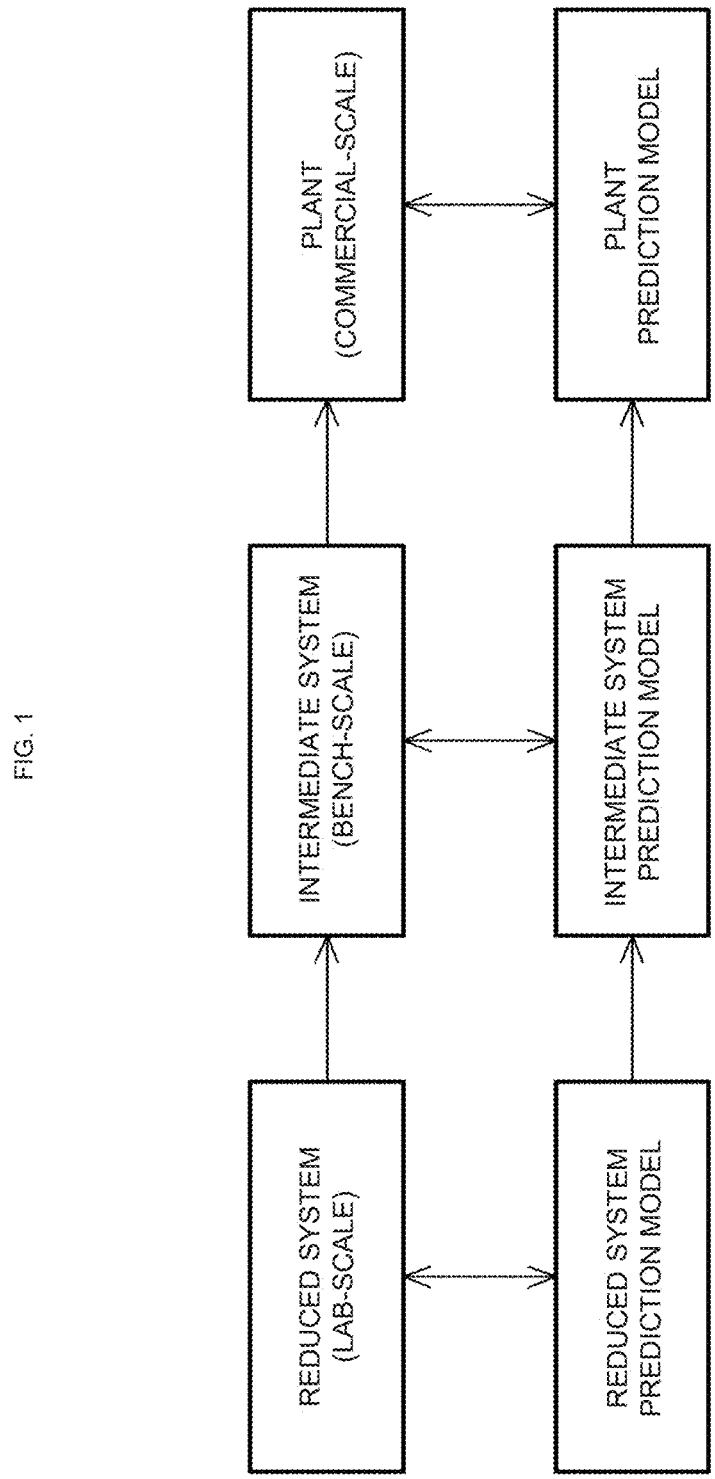
FIG. 1 is a diagram showing a schematic diagram of a process for designing a plant.

FIG. 1 shows a schematic diagram of a process for designing a plant. The plant comprises a plurality of devices and equipment, etc. to perform a process of manufacturing products by processing raw materials (reaction, separation, drying, processing, etc.). When designing a commercial-scale plant, as described above, the design is performed by gradually scaling up a system smaller than the plant. In the example shown in this figure, the design is performed by scaling up in the order of a lab-scale (laboratory-scale) reduced system, a bench-scale intermediate system, and a commercial-scale plant. It is noted that only one system may be considered as a system smaller than the plant, or three or more systems of different scales may be considered. In the latter case, for example, a pilot-scale (prototype-scale) intermediate system may be considered between the bench-scale intermediate system and the commercial-scale plant.

For example, in plants that handle chemical substances such as petroleum, petrochemical, chemical, and synthetic pharmaceutical plants, the lab-scale reduced system is mainly configured by batch-type reactors, etc. The bench-scale intermediate system is mainly configured by a plug flow reactor (PFR) and a continuous stirred-tank reactor (CSTR), etc. The commercial-scale plant is mainly configured by the plug flow reactor and the continuous stirred-tank reactor, etc. that are larger in scale or have a plurality of stages than the bench-scale intermediate system. Chemical processes performed in such plants include processes that manufacture, for example, industrial chemicals, chemical fertilizers, paper, pulp, rubber, synthetic fibers, synthetic resins, petroleum products, pharmaceuticals, dyes, detergents, cosmetics, and bioproducts, etc. through chemical processing.

Using a prediction model for predicting a process in a system of each scale, a configuration of a device, a size of the device, an operation policy, etc. of the next-scale system are considered and the next-scale system is designed. The prediction model may be a chemical, physical, or numerical simulation of the process, or a mathematical formula for calculating various state quantities and control quantities, etc. in the process. In the case of a plant that handles chemical substances, the prediction model may be a model based on knowledge of chemical engineering or physical chemistry, such as a chemical reaction model or a chemical equilibrium model. The prediction model may be artificial intelligence, etc. that inputs parameters representing the operation condition of the system and outputs simulation results and values of various state quantities and control quantities.

The main body that designs the plant accumulates data on scale-up for various types of plant through the design and operation of many plants. This disclosure proposes an assistance method for assisting a design and an operation of a plant by using such data.

Figure 2:
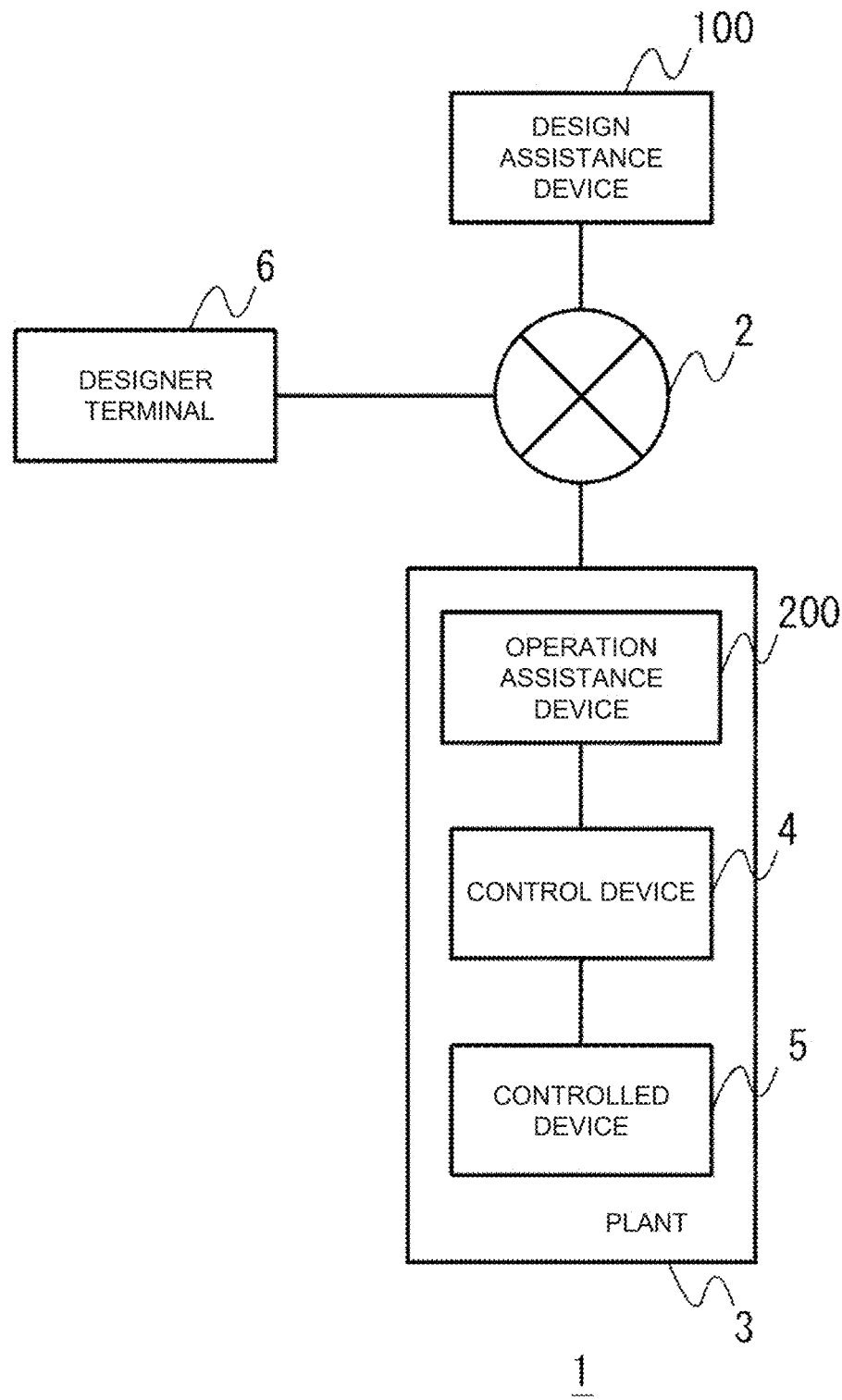
FIG. 2 is a diagram showing a configuration of an assistance system according to a first embodiment.

FIG. 2 shows the configuration of an assistance system according to an embodiment. The assistance system 1 includes a plant 3, a design assistance device 100 that assists a design of the plant 3, and a designer terminal 6 used by a designer who designs the plant 3. The design assistance device 100, the designer terminal 6, and the plant 3 are connected by an arbitrary communication network 2 such as the Internet or an in-house connection system, and are operated in an arbitrary operation form such as on-premise, cloud, or edge computing.

The plant 3 includes a controlled device 5 that performs a process, a control device 4 that sets a control amount for controlling an operation condition of the controlled device 5, and an operation assistance device 200 that assists an operation of the plant 3 using a prediction model learned by the design assistance device 100.

Figure 3:
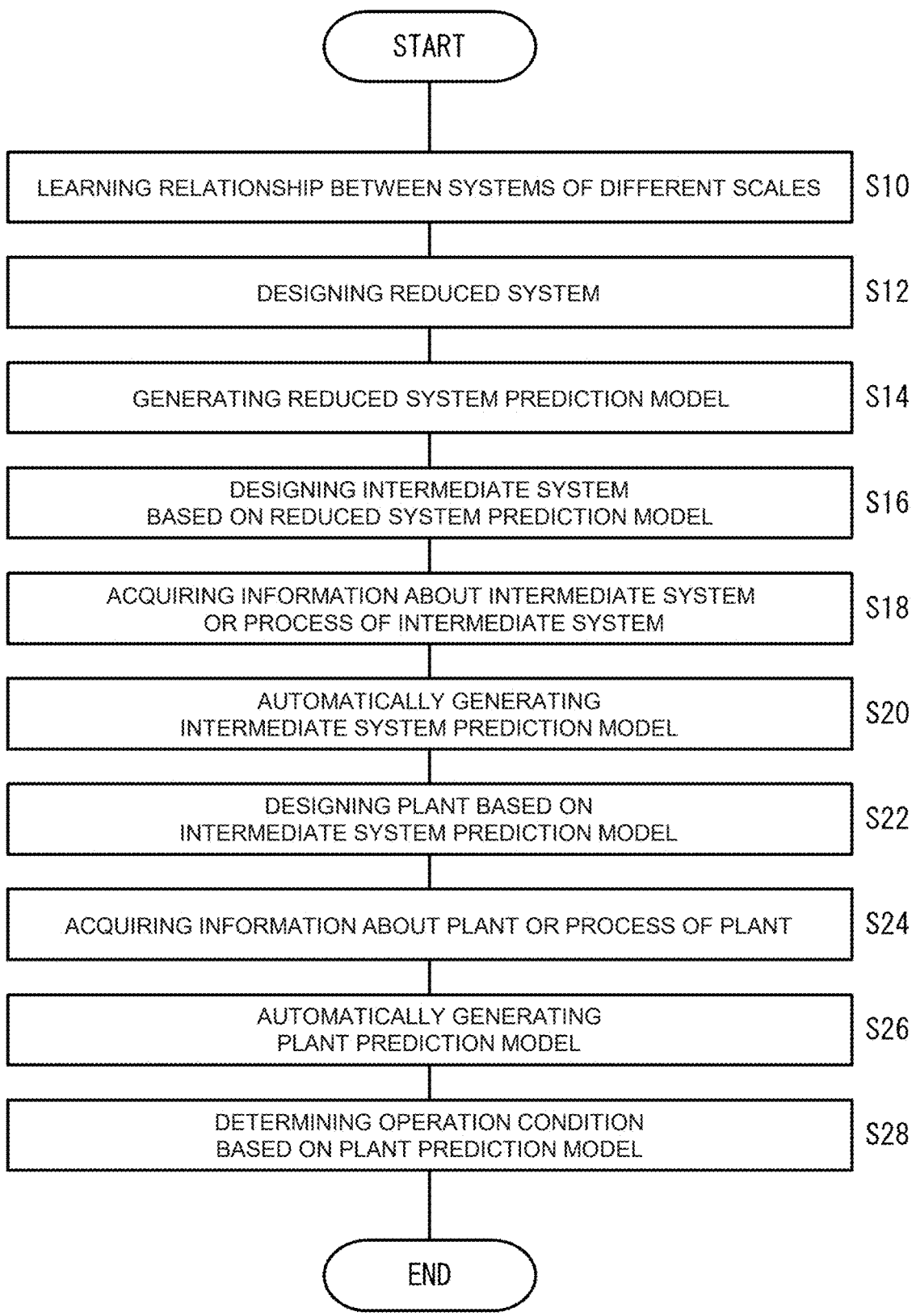
FIG. 3 is a flowchart showing a procedure of an assistance method according to the first embodiment.

FIG. 3 is a flow chart showing the procedure of the assistance method according to the embodiment of the present invention. FIG. 3 shows the procedure of the assistance method for assisting the design of the plant.

The design assistance device 100 that assists the design of the plant 3 learns a relationship between systems of different scales based on data on scale-up performed when the plant was designed in the past (S10). The design assistance device 100 learns the relationship between the systems based on information related to a plurality of systems of different scales, information of the processes when the processes are performed in the plurality of systems, or information of a model for predicting the processes performed in the plurality of systems. For example, the design assistance device 100 learns how a reaction rate coefficient of a reaction performed in a reactor and a parameter of the prediction model for simulating the reaction, etc. change when the size of the reactor is scaled up, based on the performances of past cases. The information related to the system is, for example, the number, type, and size of the devices and equipment that make up the system, etc. The information of the process is, for example, the type, number, and time of the processing that make up the process, whether it is a batch process or a continuous process, the type, amount, and physical properties of the raw materials, the type, amount, and characteristics of the catalyst, the temperature, pressure, and processing volume where the process is performed, etc. The information of the prediction model is, for example, the type of the prediction model, the type of the input data, the type of the output data, and the internal parameter, etc.

The design assistance device 100 assists the design of the reduced system (S12). The design assistance device 100 may present the configuration of the reduced system, etc., to the designer terminal 6 based on performance data from when a plant that performs a process similar to the process performed in the plant to be designed was designed.

The design assistance device 100 assists the generation of the reduced system prediction model (S14). The design assistance device 100 may automatically generate at least a part of the reduced system prediction model based on performance data of past cases similar to the reduced system or the process performed in the reduced system. The design assistance device 100 determines the model type in the reduced system prediction model, identifies reaction paths included in the process, calculates reaction rates, and generally determines the optimal reaction time based on data when the process is performed in the reduced system.

The design assistance device 100 assists the design of the intermediate system based on the reduced system prediction model (S16). The design assistance device 100 may present to the designer terminal 6 the type, number, size, etc. of the devices and equipment that make up the intermediate system based on the reduced system prediction model.

The design assistance device 100 acquires information related to the intermediate system designed in step S16 and information related to the process performed in the intermediate system (S18).

The design assistance device 100 generates at least a part of the intermediate system prediction model from the information acquired in step S18 based on the relationship between the systems learned in step S10 (S20). The design assistance device 100 applies the relationship between the systems learned based on cases similar to the reduced system or the process performed in the reduced system to the lab-scale reduced system prediction model to automatically generate a bench-scale intermediate system prediction model.

The design assistance device 100 assists the design of the plant 3 based on the intermediate system prediction model (S22). The design assistance device 100 may present the type, number, size, etc. of the devices and equipment that make up the plant 3 to the designer terminal 6 based on the intermediate system prediction model. The design assistance device 100 tunes the reaction rate in the process and models catalyst deterioration based on the intermediate system prediction model.

The design assistance device 100 acquires information related to the plant 3 designed in step S22 and information related to the process to be performed in the plant 3 (S24).

The design assistance device 100 generates at least a part of the plant prediction model from the information acquired in step S24 based on the relationship between the systems learned in step S10 (S26). The design assistance device 100 applies the relationship between the systems learned based on cases similar to the intermediate system or the process to be performed in the intermediate system to the bench-scale intermediate system prediction model to automatically generate a commercial-scale plant prediction model.

The design assistance device 100 determines the operation condition of the plant 3 based on the plant prediction model (S28). The design assistance device 100 inputs various operation conditions into the plant prediction model and searches for the operation condition that give the optimal operation point. The optimal operation point may be, for example, the operation condition where the product yield is maximized.

In this way, according to the assistance method of this embodiment, at least a part of the predictive model can be automatically generated, so that an ideal plant can be designed regardless of the ability of the designer, etc. In addition, the time, effort, cost, etc. required to design a plant can be reduced. In addition, the optimal operation condition for the plant can be determined.

FIG. 4 shows a specific example of the assistance method according to an embodiment. The plant of this specific example performs a process to produce substances B and C by adding a catalyst to a substance A that is a raw material and reacting it at the high temperature. For example, the substance A is a fraction with a boiling point range of 340 to 540° C., the substance B is a fraction with a boiling point range of 540° C. or higher, and the substance C is a fraction with a boiling point range of 340° C. or lower.

The lab-scale reduced system is configured by a batch-type reactor. In the reduced system prediction model, the effect of reaction time is taken into account using three equations that represent the time change in concentration of substances A, B, and C, respectively.

The bench-scale intermediate system is configured by a reactor where there is a reaction time distribution equivalent to a 5-stages CSTR-type in the prediction model. In the intermediate system prediction model, the time change in concentration of substances A, B, and C is expressed by an equation that differs from the reduced system prediction model due to differences in reactors. In a CSTR, residence time is also taken into account in the reaction time. In a system where there is a distribution in reaction time, the average reaction time $t_r(s)$ is expressed as $t_r = V/v$, where V (m³) is the reactor volume and v (m³/s) is the volumetric flow rate of the reactor.

The commercial-scale plant is configured by a reactor where there is a reaction time distribution equivalent to a 10-stages CSTR-type in the prediction model. In the plant prediction model, the time change in the concentrations of substances A, B, and C is expressed by an equation of the same form as the intermediate system.

In the reduced system, the batch process is performed, so the operation time is at most the time for one reaction. Therefore, the degree of catalyst deterioration is not significant and does not need to be taken into account in the model. However, in the intermediate system, the continuous process is performed, so the operation time is on the scale of several days to several years, and the effect of catalyst activity deterioration cannot be ignored. Therefore, in the intermediate system prediction model, the effect of catalyst activity is taken into account using an equation that represents the time change in catalyst activity.

Furthermore, in the reduced system, the inside of the reactor is sufficiently stirred, so diffusion of materials is not a rate-limiting factor and does not need to be taken into account in the model. However, in the intermediate system, diffusion of materials can become a rate-limiting factor when the flow rate is low, so the effects of diffusion of materials cannot be ignored. Therefore, the effects of diffusion of materials are also modeled in the intermediate system prediction model.

FIG. 5 shows another specific example of the assistance method according to the embodiment. The plant of this specific example performs a process of separating a raw material containing a mixture of a plurality of fractions by distillation.

The lab-scale reduced system is configured by a single distillation tower for separating a plurality of boiling point fractions. In the reduced system, the temperature inside the distillation tower increases as the low boiling point fractions are separated. Therefore, the reduced system prediction model includes a chemical equilibrium model that changes according to the time change in the internal temperature.

The bench-scale intermediate system is configured by a distillation tower with a plurality of stages with different temperatures and pressures. In the intermediate system, each boiling point fraction is separated at each stage. Therefore, the intermediate system prediction model includes a chemical equilibrium model for each stage.

The commercial-scale plant is also configured by a distillation tower with a plurality of stages with different temperatures and pressures. The plant prediction model also includes a chemical equilibrium model for each stage.

As such, there are various differences between a plurality of systems due to differences in scale, and therefore systematic differences between the predictive models of a plurality of systems. By learning these relationships, it is possible to automatically generate predictive models.

The design assistance device 100 may learn an AI (artificial intelligence) that automatically generates a predictive model through machine learning. This automatic generation AI may be a neural network that inputs information related to the smaller-scale system, information of a process when a process is performed in the smaller-scale system, information of a predictive model for predicting a process to be performed in the smaller-scale system, information related to the larger-scale system, information of a process when a process is performed in the larger-scale system, information related to the differences between the smaller-scale system and the larger-scale system, etc., and outputs information of a predictive model for predicting a process to be performed in the larger-scale system.

In the reaction system shown in FIG. 4, the automatic generation AI that automatically generates the intermediate system prediction model may input process information and information related to the differences in the systems, and output information of the intermediate system prediction model. For example, the automatic generation AI may input information such as the physical properties of the processed material, the physical properties of the product, the type of reaction, the processing amount, temperature, and pressure as process information, and input information such as whether the reduced system process is a continuous process or not, whether the intermediate system process is a continuous process or not, the processing amount of the reduced system process, and the processing amount of the intermediate system process as information related to the differences in the systems, and output information such as the model type (PFR, CSTR, etc.), model structure (presence or absence of catalytic activity term, presence or absence of mass transfer equation, etc.), and model coefficients (reaction rate coefficients, etc.) as information of the intermediate system prediction model. The intermediate system prediction model may include a plurality of models.

In the reaction system shown in FIG. 4, the automatic generation AI that automatically generates the intermediate system prediction model may input information related to the system and information related to the differences between the systems, and output information of the intermediate system prediction model. For example, the automatic generation AI may input information such as model type (PFR, CSTR, etc.), number of model reaction paths, and model coefficients (reaction rate constants, etc.) as information related to the system, and input information such as whether the reduced system process is a continuous process or not, whether the intermediate system process is a continuous process or not, the processing amount of the reduced system process, and the processing amount of the intermediate system process as information related to the differences between the systems, and output information such as model type (PFR, CSTR, etc.), model structure (presence or absence of catalytic activity terms, presence or absence of mass transfer equation, etc.), and model coefficients (reaction rate coefficients, etc.) as information of the intermediate system prediction model. The intermediate system prediction model may include a plurality of models.

In the reaction system shown in FIG. 4, the automatic generation AI that automatically generates the intermediate system prediction model may input information of the process, information related to the system, and information related to the differences between the systems, and output information of the intermediate system prediction model. For example, the automatic generation AI may input information such as the physical properties of the processed material, the physical properties of the product, the type of reaction, the processing amount, temperature, and pressure as the information of the process, input information such as the model type (PFR, CSTR, etc.), the number of model reaction paths, and model coefficients (reaction rate constants, etc.) as the information related to the system, input information such as whether the reduced system process is a continuous process or not, whether the intermediate system process is a continuous process or not, the processing amount of the reduced system process, and the processing amount of the intermediate system process as the information related to the differences between the systems, and output information such as the model type (PFR, CSTR, etc.), model structure (presence or absence of catalytic activity terms, presence or absence of mass transfer equation, etc.), and model coefficients (reaction rate coefficients, etc.) as the information of the intermediate system prediction model. The intermediate system prediction model may include a plurality of models.

In the distillation system shown in FIG. 5, the automatic generation AI that automatically generates the intermediate system prediction model may input information of the process, information related to the system, and information related to the differences between the systems, and output information of the intermediate system prediction model. For example, the automatic generation AI may input information such as the physical properties of the processed material, the processing amount, temperature, pressure, and processing time (in the case of a batch process) as the information of the process, input information such as model coefficients (equilibrium constants, etc.) and the number of theoretical stages of the distillation tower (in the case of a continuous process) as the information related to the system, input information such as whether the reduced system process is a continuous process or not, whether the intermediate system process is a continuous process or not, the processing amount of the reduced system process, and the processing amount of the intermediate system process as the information related to the differences between the systems, and output information such as model coefficients (equilibrium constants, etc.) and the number of theoretical stages of the distillation tower (in the case of a continuous process) as the information of the intermediate system prediction model. The intermediate system prediction model may include a plurality of models.

A specific example of automatically generating the intermediate system prediction model for the reaction system shown in FIG. 4 is shown below. The lab-scale system information includes the reactor volume and that it is a batch process (tank reactor), the bench-scale system information includes the reactor volume and that it is a continuous process (CSTR reactor), the lab-scale process information includes the amounts of substances B and C produced per unit time and the amount of catalyst D at the lab-scale, the lab-scale reduced system prediction model information includes the reaction time model shown in FIG. 4, and these information are input to the automatic generation AI. The automatic generation AI outputs the bench-scale reaction time model, reaction temperature model, reaction pressure model, and material diffusion model shown in FIG. 4 as the intermediate system prediction model.

Figure 6:
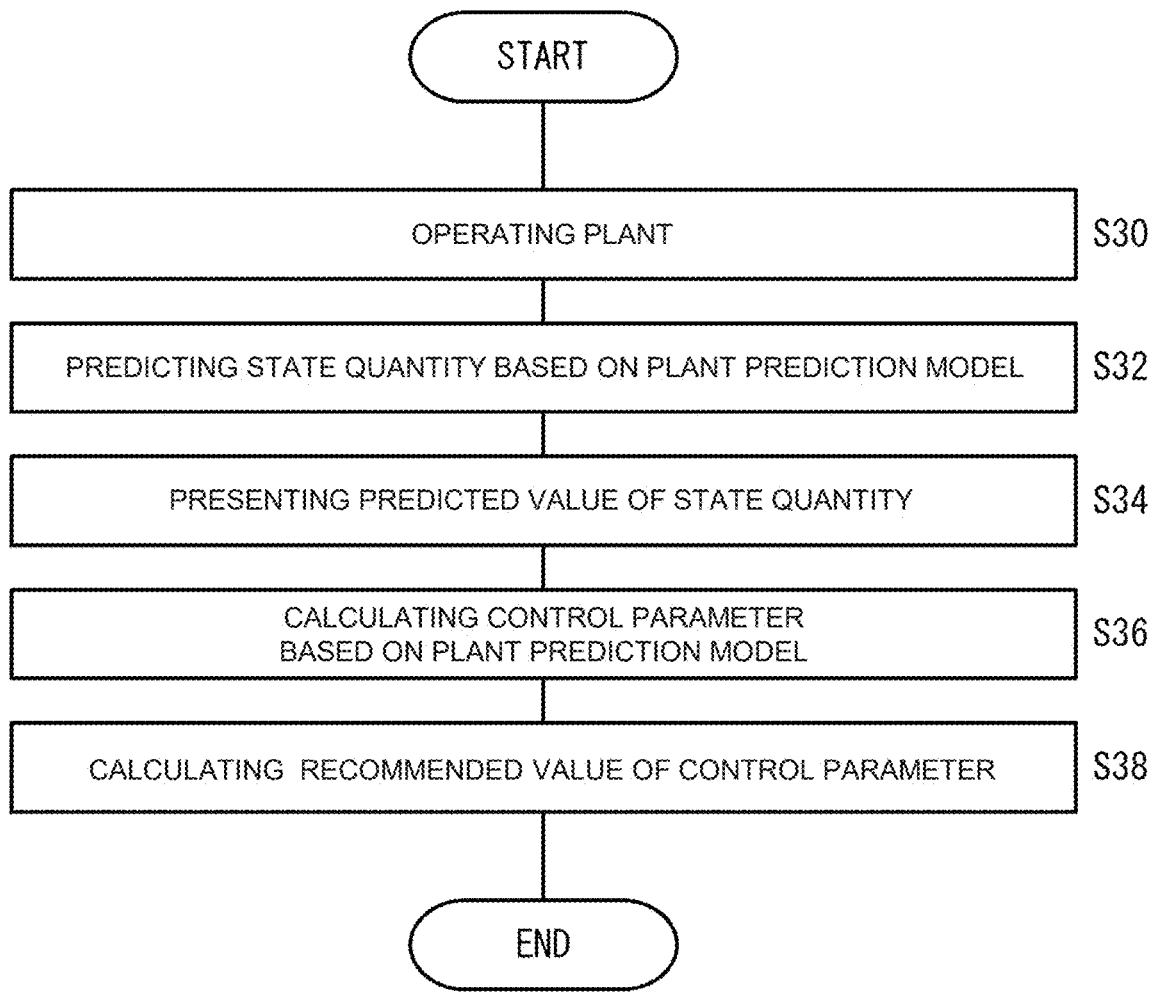
FIG. 6 is a flowchart showing a procedure of an assistance method according to the first embodiment.

FIG. 6 is a flowchart showing the procedure of the assistance method according to an embodiment of the present invention. FIG. 6 shows the procedure of the assistance method for assisting the control of the plant during operation.

When the plant is operated (S30), the operation assistance device 200 predicts the state quantity representing the state of the plant based on the plant prediction model (S32). The plant prediction model can be used as a soft sensor because it can simulate processes performed in the plant and calculate the state quantity of the plant. The design assistance device 100 may predict state quantities representing the past, present, or future states of the plant.

The operation assistance device 200 presents to the operator the predicted value of the state quantity predicted in step S32 (S34). This allows the operator to control the operation of the plant 3 while accurately grasping the state of the plant.

The operation assistance device 200 calculates the control parameter for controlling the plant based on the plant prediction model (S36). The design assistance device 100 calculates the recommended value of the control quantity by inputting the value of the current state quantity and the value of the changed control quantity into the plant prediction model and predicting value of the future state quantity.

The operation assistance device 200 presents the recommended value of the control quantity calculated in step S36 to the operator (S38). This allows the operator to accurately perform control for stable and efficient operation of the plant.

Figure 7:
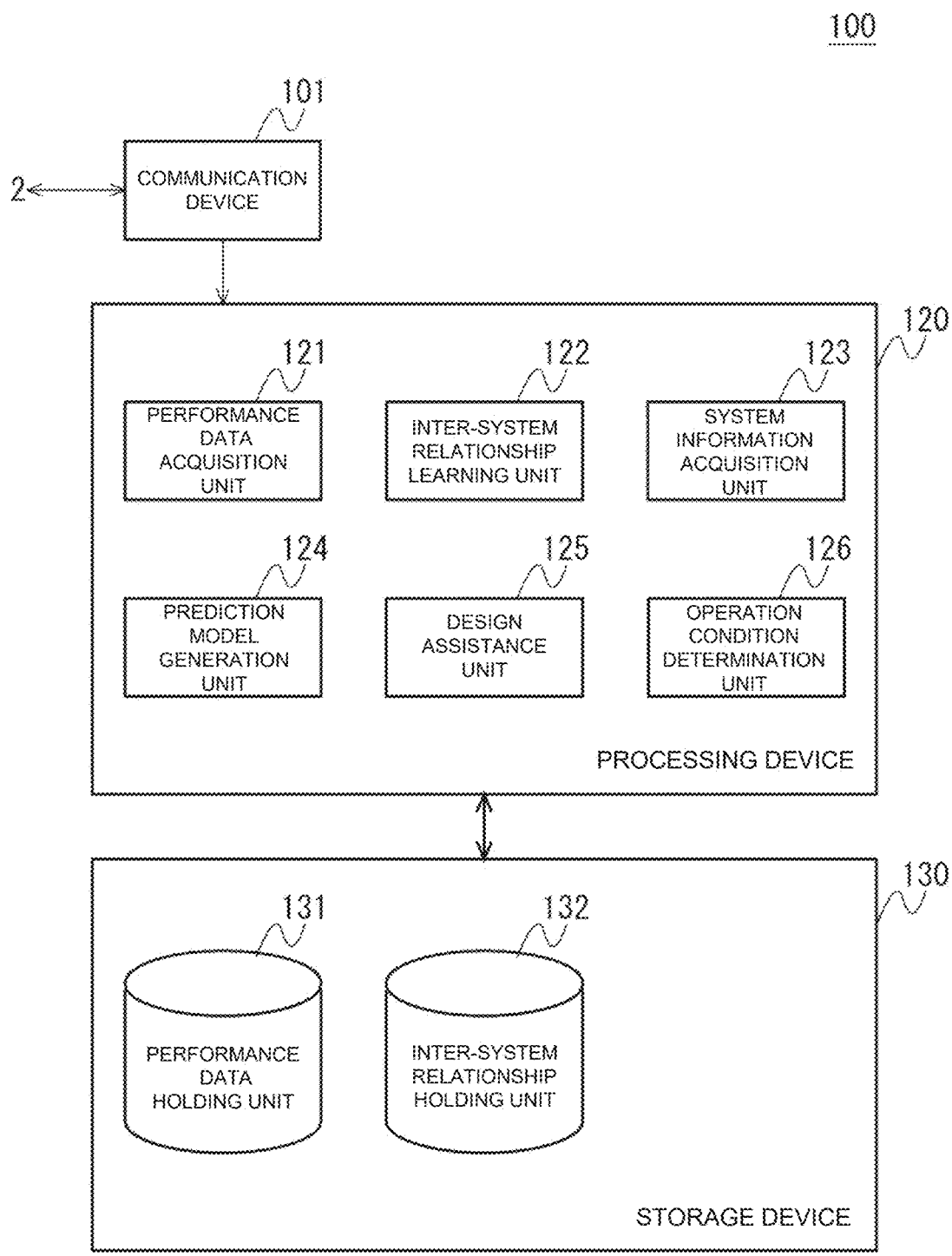
FIG. 7 is a diagram showing a configuration of a design assistance device according to the first embodiment.

FIG. 7 shows the configuration of a design assistance device 100 according to an embodiment. The design assistance device 100 includes a communication device 101, a processing device 120, and a storage device 130.

The communication device 101 controls wireless or wired communication. The communication device 101 transmits and receives data to and from the designer terminal 6, etc. via the communication network 2.

The storage device 130 stores data and computer programs used by the processing device 120. The storage device 130 includes a performance data holding unit 131 and an inter-system relationship holding unit 132.

The performance data holding unit 131 holds performance data generated when the plant was designed. The performance data may be, for example, the type, number, and size of the devices and equipment that make up the system at each scale, the type, content, and characteristics of the process at each scale, the type and parameters of the prediction model at each scale, etc.

The inter-system relationship holding unit 132 holds information indicating the relationship between systems of different scales.

The processing device 120 includes a performance data acquisition unit 121, an inter-system relationship learning unit 122, a system information acquisition unit 123, a prediction model generation unit 124, a design assistance unit 125, and an operation condition determination unit 126. In terms of hardware components, these configurations can be realized by any circuit, a computer CPU, memory, programs loaded into memory, etc., but here functional blocks realized by their cooperation are depicted. Therefore, it will be understood by those skilled in the art that these functional blocks can be realized in various forms using only hardware, only software, or a combination of both.

The performance data acquisition unit 121 acquires performance data that was generated when the plant was designed, and stores the data in the performance data holding unit 131.

The inter-system relationship learning unit 122 learns the relationship between systems of different scales based on the performance data held by the performance data holding unit 131, and stores information on the learned inter-system relationship in the inter-system relationship holding unit 132.

The system information acquisition unit 123 acquires information related to the process or the reduced system when a process to be performed in the plant 3 is performed in the reduced system smaller in scale than the plant 3.

The prediction model generation unit 124 automatically generates at least a part of the prediction model for predicting the process to be performed at the next scale from the information acquired by the system information acquisition unit 123 based on the inter-system relationship stored in the inter-system relationship holding unit 132.

The design assistance unit 125 assists the design of the next-scale system based on the prediction model.

The operation condition determination unit 126 determines the operation condition of the plant 3 based on the prediction model.

Figure 8:
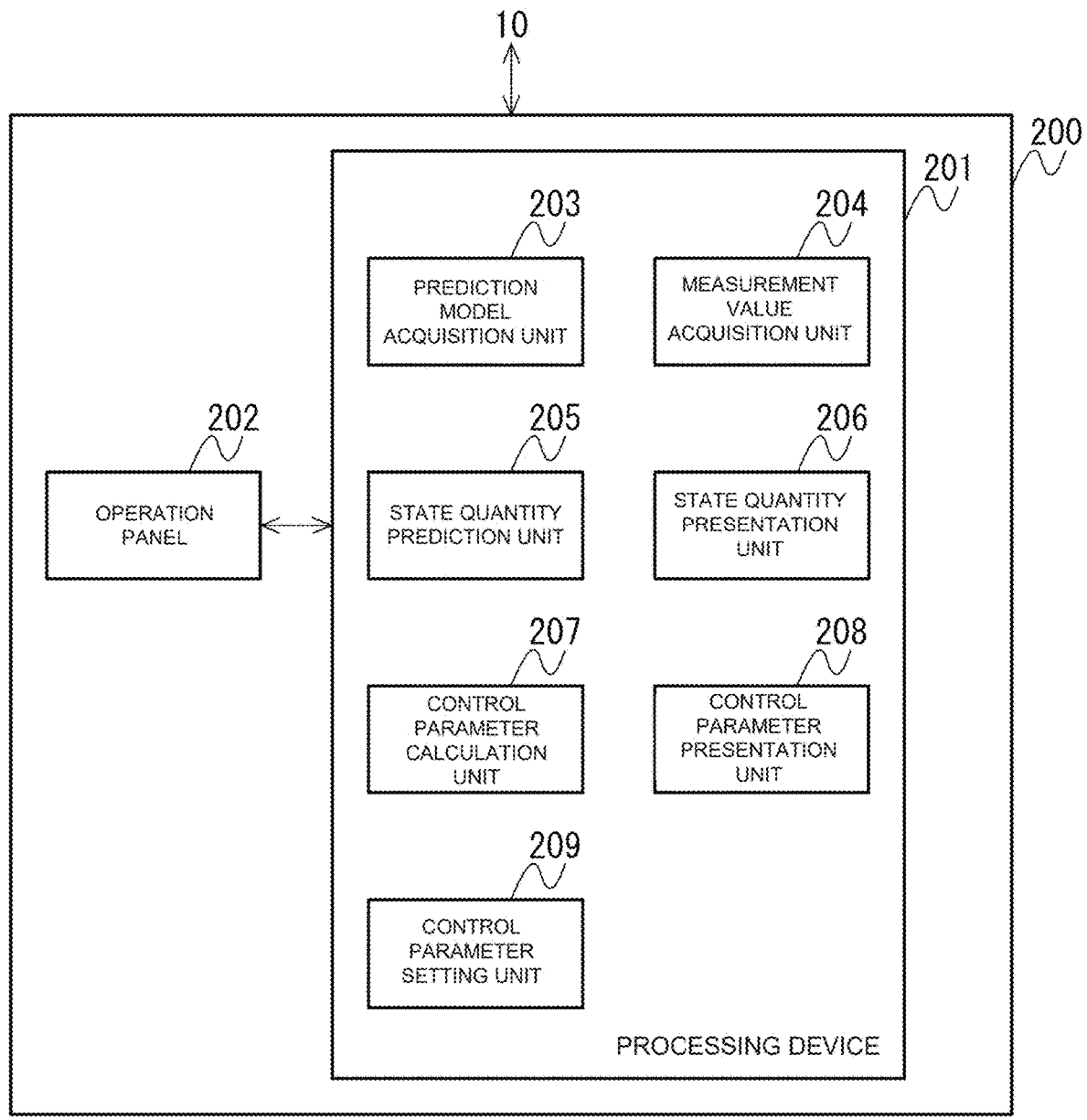
FIG. 8 is a diagram showing a configuration of an operation assistance device according to the first embodiment.

FIG. 8 shows a configuration of an operation assistance device 200 according to an embodiment. The operation assistance device 200 includes a processing device 201 and an operation panel 202.

The operation panel 202 displays on a display device a plurality of measurement values showing the states of a plurality of controlled devices 5 that configure the plant 3, the setting value of control operation quantity set in the controlled devices 5 by the control device 4, and the value of control parameter set in the control device 4, etc., and also accepts input of the value of control parameter, etc. from the operator.

The processing device 201 includes a prediction model acquisition unit 203, a measurement value acquisition unit 204, a state quantity prediction unit 205, a state quantity presentation unit 206, a control parameter calculation unit 207, a control parameter presentation unit 208, and a control parameter setting unit 209. In terms of hardware components, these configurations can be realized by any circuit, a computer CPU, memory, programs loaded into memory, etc., but here functional blocks realized by their cooperation are depicted. Therefore, it will be understood by those skilled in the art that these functional blocks can be realized in various forms using only hardware, only software, or a combination of both.

The prediction model acquisition unit 203 acquires the prediction model of the plant 3 from the design assistance device 100.

The measurement value acquisition unit 204 acquires measurement values showing the state of the controlled device 5 from various sensors, etc. provided in the plant 3.

The state quantity prediction unit 205 predicts the state quantity representing the state of the plant 3 based on the prediction model acquired by the prediction model acquisition unit 203.

The state quantity presentation unit 206 presents the predicted value of the state quantity predicted by the state quantity prediction unit 205 on the operation panel 202.

The control parameter calculation unit 207 calculates the recommended value of the control parameter to be set in the control device 4 based on the prediction model acquired by the prediction model acquisition unit 203.

The control parameter presentation unit 208 presents the recommended value of the control parameter calculated by the control parameter calculation unit 207 on the operation panel 202.

The control parameter setting unit 209 sets the setting value of the control parameter input by the operator via the operation panel 202 in the control device 4.

Second Embodiment

As a second embodiment of the present disclosure, an information processing technique for learning a relationship between systems in the assistance system 1 of the first embodiment will be described.

Figure 9:
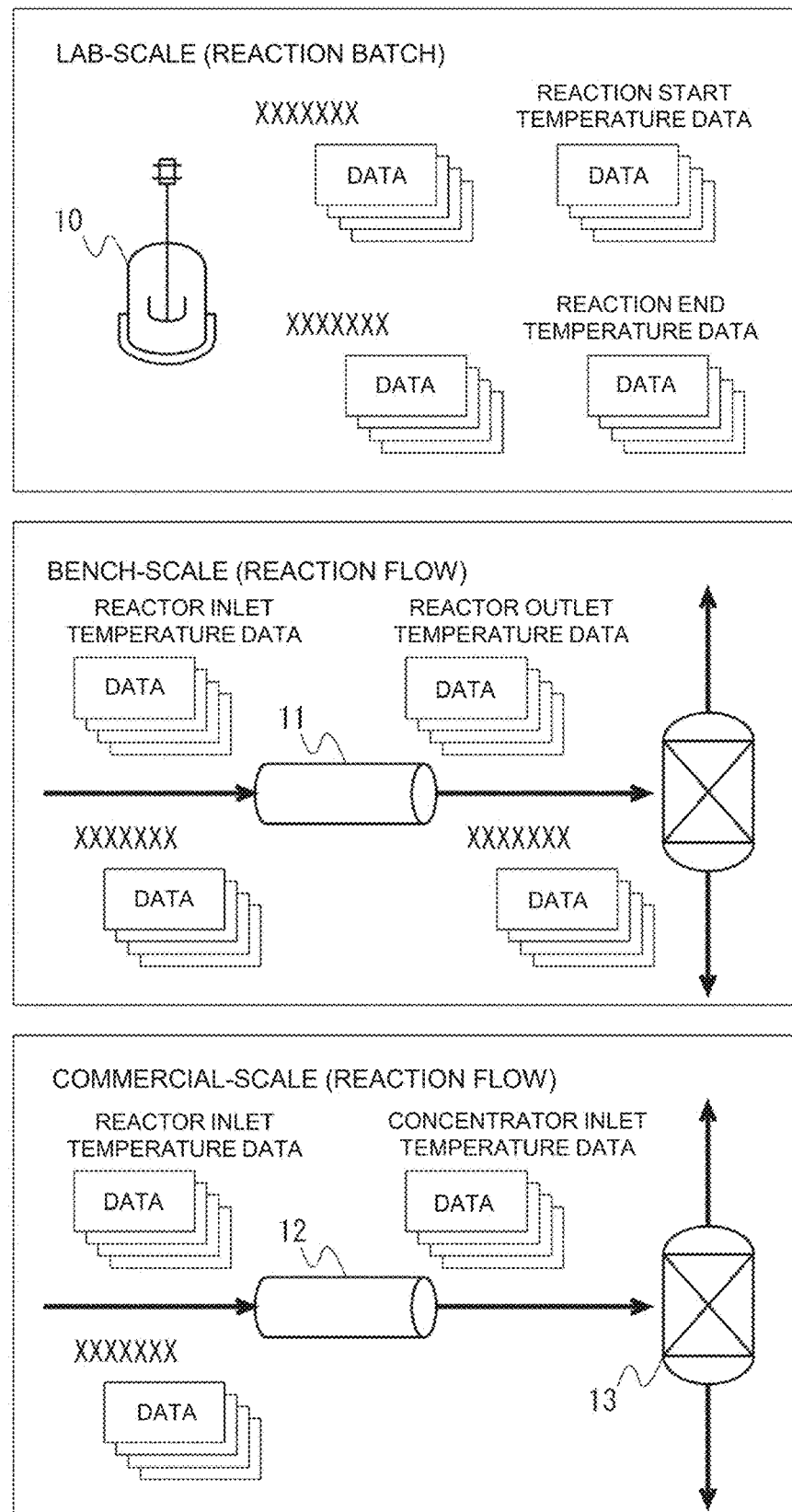
FIG. 9 is a diagram showing a schematic example of data held in a performance data holding unit of the design assistance device.

FIG. 9 shows an example of data held in the performance data holding unit 131 of the design assistance device 100. When considering the design of a lab-scale reduced system, the performance data holding unit 131 records "reaction start temperature data" showing the temperature at the start of the reaction in the batch-type reactor 10 and "reaction end temperature data" showing the temperature at the end of the reaction as information related to the process to be performed in the reduced system. When considering the design of a bench-scale intermediate system, the performance data holding unit 131 records "reactor inlet temperature data" showing the inlet temperature of the continuous-flow reactor 11 and "reactor outlet temperature data" showing the outlet temperature as information related to the process to be performed in the intermediate system. When considering the design of a commercial-scale plant, the performance data holding unit 131 records "reactor inlet temperature data" showing the inlet temperature of the continuous-flow reactor 12 and "concentrator inlet temperature data" showing the inlet temperature of the subsequent concentrator 13. Here, the process refers to the overall process of processing raw materials to obtain a product.

The "reaction start temperature data" in the reduction system, the "reactor inlet temperature data" in the intermediate system, and the "reactor inlet temperature data" in the plant are all data that show the temperature of the raw materials when the reaction starts in the reactor. In addition, the "reaction end temperature data" in the reduction system, the "reactor outlet temperature data" in the intermediate system, and the "concentrator inlet temperature data" in the plant are all data that show the temperature of the reaction product when the reaction ends in the reactor.

Also, in a batch process in the reduced system, the "processing volume" represents the volume processed in one go by the batch-type reactor, measured in kg/go, whereas a continuous process in the intermediate system and the plant, the flow rate of the continuous flow reactor represents the processing volume, measured in kg/h. Also, in a batch process in a reduced system, the "reaction time" represents the time for one reaction in the batch-type reactor, whereas a continuous process in the intermediate system and the plant, the residence time in the continuous flow reactor represents the reaction time.

In this way, when considering scale-up, a large amount of system-related data, process-related data, etc. is generated, but even data with the same content may be recorded in the performance data holding unit 131 with different names or different data structures. Therefore, in order to use the data stored in the performance data holding unit 131 to efficiently and highly accurately learn the relationship between systems, a technique is needed to associate and integrate data that is stored in the performance data holding unit 131 with different names or different data structures despite having the same or similar content.

In order to solve such problems, in the assistance system 1 of this embodiment, from a first data set including at least a first process data (for example, "reaction start temperature data") related to a first process (for example, a process to be performed in the reduced system) and first system data (for example, type and size of the reactor) related to a system (for example, a reduced system) where the first process is performed, and a second data set including at least a second process data (for example, "reactor inlet temperature data") related to a second process (for example, a process to be performed in the intermediate system) and a second system data (for example, type and size of the reactor) related to a system (for example, the intermediate system) where the second process is performed, at least one of a pair of the first process data and the second process data (for example, "reaction start temperature data" of the reduced system process and "reactor inlet temperature data" of the intermediate system process) whose contents are the same as or similar to each other and a pair of the first system data and the second system data whose contents are the same as or similar to each other is extracted, and at least one of the pairs extracted is stored in a storage unit in a manner where their correspondence relationship is identifiable. This makes it possible to associate and integrate data that has different names and structures but the same or similar content, thereby enabling efficient and highly accurate learning of the relationship between systems.

Here, "data whose contents are the same as or similar to each other" is not necessarily limited to the same sensor value of the same device in a system of a different scale, but may include the same or similar sensor values that represent the state of the same or similar device in a system of the same or a different scale. "Data whose contents are the same as or similar to each other" includes corresponding sensor values of corresponding devices that are used to acquire and calculate specific information during design and operation of the process, etc. in systems of different scales.

Figure 10:
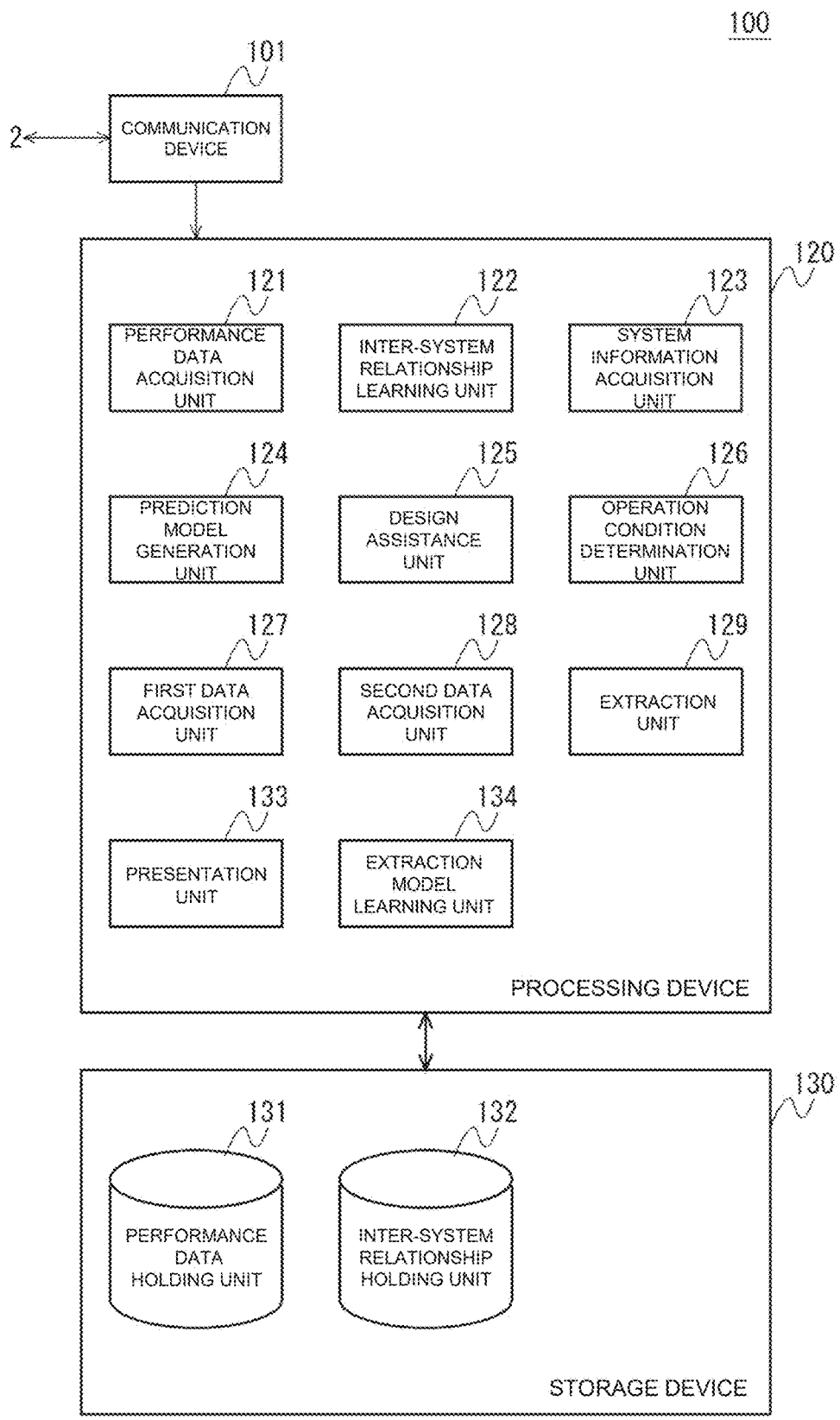
FIG. 10 is a diagram showing a configuration of the design assistance device of an assistance system according to a second embodiment.

FIG. 10 shows the configuration of a design assistance device 100 of the assistance system 1 according to the second embodiment. The design assistance device 100 of the second embodiment includes, in addition to the configuration of the design assistance device 100 of the first embodiment shown in FIG. 7, a first data acquisition unit 127, a second data acquisition unit 128, an extraction unit 129, a presentation unit 133, and an extraction model learning unit 134. The other configurations and operations are the same as those of the first embodiment. The design assistance device 100 of the second embodiment functions as an information processing device of the present disclosure.

The first data acquisition unit 127 acquires a first data set including at least a first process data related to the first process and the first system data related to the system where the first process is performed. The second data acquisition unit 128 acquires a second data set including at least a second process data related to the second process and the second system data related to the system where the second process is performed. Of a plurality of scale systems considered during scale-up, the process to be performed in the smaller scale is the first process, and the process to be performed in the larger scale is the second process. For example, when considering scale-up from the reduced system to the intermediate system, the process to be performed in the reduced system is the first process, and the process to be performed in the intermediate system is the second process. When considering scale-up from the intermediate system to the plant, the process to be performed in the intermediate system is the first process, and the process to be performed in the plant is the second process. The first data acquisition unit 127 and the second data acquisition unit 128 may sequentially acquire data generated during scale-up consideration. The first data acquisition unit 127 and the second data acquisition unit 128 may acquire data that was generated when considering past scale-up and that is accumulated in the performance data holding unit 131.

The extraction unit 129 extracts at least one of a pair of first process data and second process data whose contents are the same as or similar to each other and a pair of first system data and second system data whose contents are the same as or similar to each other from the first data set acquired by the first data acquisition unit 127 and the second data set acquired by the second data acquisition unit 128, and stores at least one of the pairs extracted in the performance data holding unit 131 in a manner where their correspondence relationship is identifiable. The extraction unit 129 may extract the data pair based on the name, structure, and storage location of the data, the type, name, number, and size of the devices and apparatuses configuring the system, the type and content of the process to be performed in the system, and the type, amount, and characteristics, etc. of the processing target to be processed in the process. The extraction unit 129 may extract the data pair using a machine-learned trained extraction model. The extraction unit 129 may extract the data pair using a rule-based algorithm. The extraction model and the algorithm may be created for each type of system, such as a reaction system, a separation system (crystallization system, extraction system, centrifugation system, distillation system, etc.), or a drying system, or may be created for each type of process.

The presentation unit 133 presents data, extracted by the extraction unit 129, where content is the same as or similar to the predetermined data. The presentation unit 133 presents a pair of data sets including data where content is the same as or similar. The presentation unit 133 may transmit the data to be presented to the designer terminal 6.

The extraction model learning unit 134 learns the extraction model to be used by the extraction unit 129. The extraction model learning unit 134 may learn a dictionary, etc. showing the correspondence relationship between spelling variations commonly used as names of the same data. The extraction model learning unit 134 may learn the extraction model by referring to the type, number, and connection relationship of the device and the equipment configuring the reduced system, the intermediate system, the plant, etc. under consideration. For example, in the example shown in FIG. 9, the extraction model learning unit 134 may learn that the outlet of the reactor 12 and the inlet of the concentrator 13 have the same meaning by referring to the connection relationship where the concentrator 13 is connected after the reactor 12.

Figure 11:
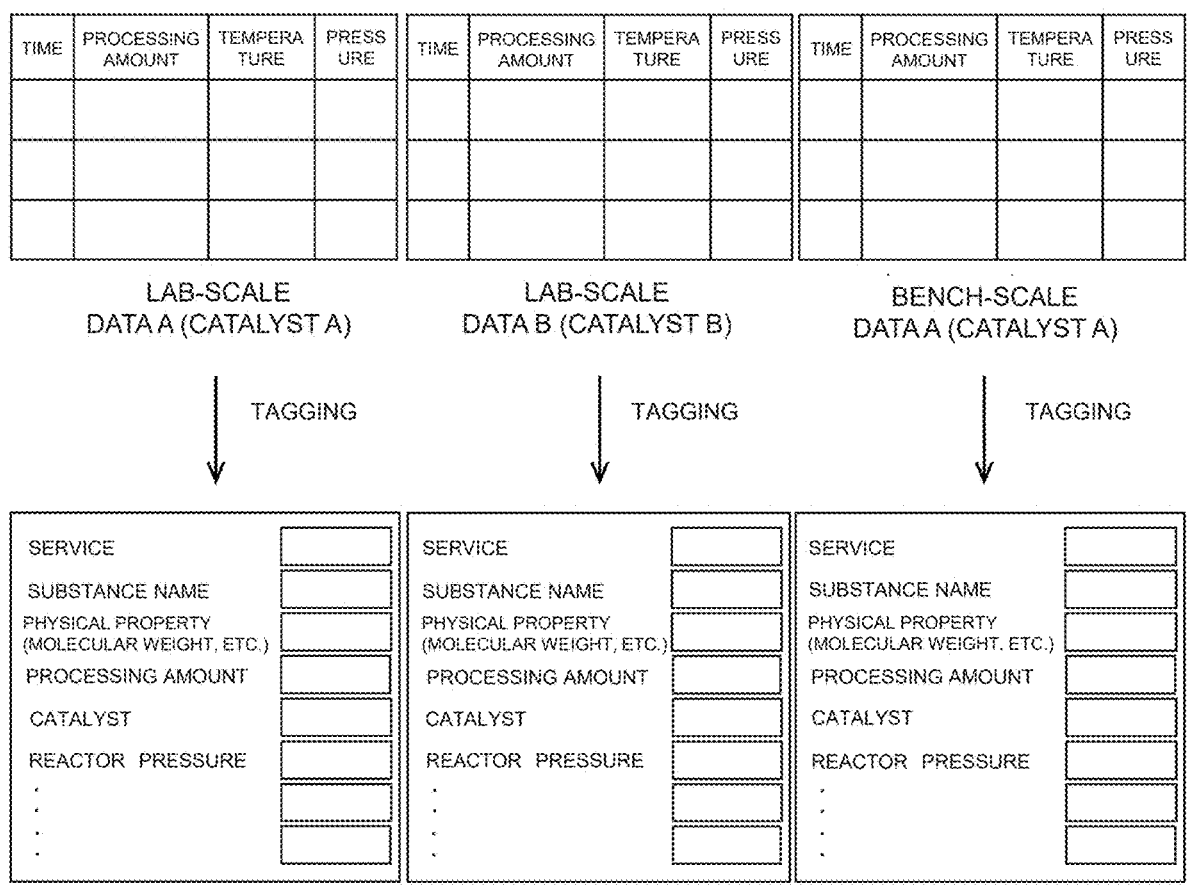
FIG. 11 is a diagram showing an example of a data structure of the performance data holding unit.

FIG. 11 shows an example of the data structure of the performance data holding unit 131. In the example shown in this figure, the process data and the system data when catalyst A is used for chemical reaction R in a lab-scale reduced system are classified and stored in a first group, the process data and the system data when catalyst B is used for chemical reaction R in a lab-scale reduced system are classified and stored in a second group, and the process data and the system data when catalyst A is used for chemical reaction R in a bench-scale intermediate system are classified and stored in a third group. The extraction unit 129 attaches the same data tag to the extracted data pair and stores the pair in the performance data holding unit 131.

FIG. 12 shows another example of the data structure of the performance data holding unit 131. In the example shown in this figure, the pair of data extracted by the extraction unit 129 are classified into the same group and stored. Information showing which data set each piece of data is included in may also be stored in the performance data holding unit 131. The extraction unit 129 groups the extracted pair of data and stores the pair in the performance data holding unit 131.

In the above example, the pair of data whose contents is the same as or similar to each other is stored in a manner where their correspondence relationship is identifiable in the performance data holding unit 131. However, the correspondence relationship between pairs of data may be extracted by the extraction unit 129 when considering scale-up and temporarily stored in the storage device 130.

Figure 13:
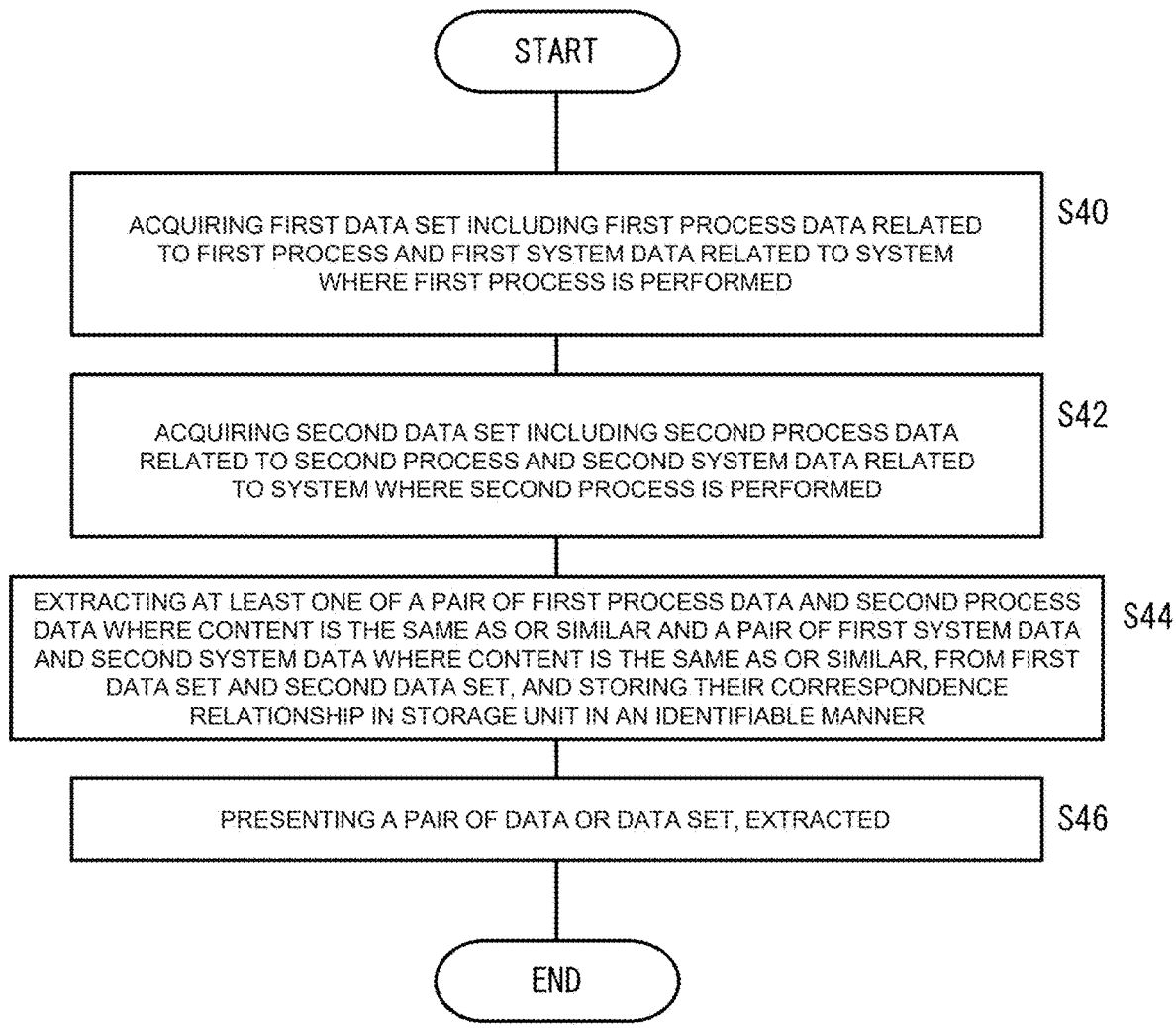
FIG. 13 is a flowchart showing a procedure of an information processing method according to the first embodiment.

FIG. 13 is a flowchart showing the procedure of the information processing method according to the second embodiment. The first data acquisition unit 127 acquires the first data set including at least the first process data related to the first process and the first system data related to the system where the first process is performed (S40). The second data acquisition unit 128 acquires the second data set including at least the second process data related to the second process and the second system data related to the system where the second process is performed (S42). The extraction unit 129 extracts at least one of a pair of the first process data and the second process data whose contents are the same as or similar to each other and a pair of the first system data and the second system data whose contents are the same as or similar to each other, from the first data set acquired by the first data acquisition unit 127 and the second data set acquired by the second data acquisition unit 128, and stores at least one of the pairs extracted in the performance data holding unit 131 in a manner where their correspondence relationship is identifiable (S44). The presentation unit 133 presents a pair of data set including data where content is the same as or similar to the predetermined data, and data where content is the same as or similar, extracted by the extraction unit 129 (S46).

The present invention has been described above based on the embodiments. The embodiments are merely illustrative, and it will be understood by those skilled in the art that various modifications are possible in the combination of each of the components and each of the processing processes, and that such modifications are also within the scope of the present invention.

REFERENCE SIGNS LIST

1: assistance system, 2: communication network, 3: plant, 4: control device, 5: controlled device, 6: designer terminal, 100: design assistance device, 101: communication device, 120: processing device, 121: performance data acquisition unit, 122: inter-system relationship learning unit, 123: system information acquisition unit, 124: prediction model generation unit, 125: design assistance unit, 126: operation condition determination unit, 127: first data acquisition unit, 128: second data acquisition unit, 129: extraction unit, 130: storage device, 131: performance data holding unit, 132: inter-system relationship holding unit, 133: presentation unit, 134: extraction model learning unit, 200: operation assistance device, 201: processing device, 202: operation panel, 203: prediction model acquisition unit, 204: measurement value acquisition unit, 205: state quantity prediction unit, 206: state quantity presentation unit, 207: control parameter calculation unit, 208: control parameter presentation unit, 209: control parameter setting unit

INDUSTRIAL APPLICABILITY

The present invention can be used in an assistance devices for assisting a design of a plant.

The invention claimed is:
1. An information processing device, comprising:
a first acquisition unit;
a second acquisition unit; and
an extraction unit, wherein
the first acquisition unit acquires a first data set including at least a first process data related to a first process and first system data related to a system where the first process is performed,
the second acquisition unit acquires a second data set including at least a second process data related to a second process and a second system data related to a system where the second process is performed, and the extraction unit extracts at least one of a pair of the first process data and the second process data whose contents are the same as or similar to each other and a pair of the first system data and the second system data whose contents are the same as or similar to each other from the first data set and the second data set, and stores at least one of the pairs extracted in a storage unit in a manner where their correspondence relationship is identifiable.

2. The information processing device of claim 1, wherein the first process and the second process are the same process, and the system where the first process is performed and the system where the second process is performed are systems of different scales.

3. The information processing device of claim 1, wherein the extraction unit extracts the pair using a machine-learned trained model or algorithm.

4. The information processing device of claim 1, wherein the extraction unit classifies the pair into the same group and stores the pair in the storage unit.

5. The information processing device of claim 1, wherein the extraction unit classifies the process data and the system data of the first process into a first group, classifies the process data and the system data of the second process into a second group, attaches the same tag to the pair, and stores the pair in the storage unit.

6. The information processing device of claim 1, wherein the system is a reactive system, a separated system, or a dry system.

7. The information processing device of claim 1, wherein the information processing device comprises a presentation unit, and the presentation unit presents data where content is the same as or similar to a predetermined data.

8. The information processing device of claim 1, wherein the information processing device comprises a presentation unit, and the presentation unit presents a pair of data sets including data where content is the same as or similar.

9. An information processing program that makes a computer function as a first acquisition unit, a second acquisition unit and an extraction unit, wherein the first acquisition unit acquires a first data set including at least a first process data related to a first process and a first system data related to a system where the first process is performed, the second acquisition unit acquires a second data set including at least a second process data related to a second process and a second system data related to a system where the second process is performed, and the extraction unit extracts at least one of a pair of the first process data and the second process data whose contents are the same as or similar to each other and a pair of the first system data and the second system data whose contents are the same as or similar to each other from the first data set and the second data set, and stores at least one of the pairs extracted in a storage unit in a manner where their correspondence relationship is identifiable.

10. An information processing method where a computer performs steps of:

acquiring a first data set including at least a first process data related to a first process and a first system data related to a system where the first process is performed, acquiring a second data set including at least a second process data related to a second process and a second system data related to a system where the second process is performed, and extracting at least one of a pair of the first process data and the second process data whose contents are the same as or similar to each other and a pair of the first system data and the second system data whose contents are the same as or similar to each other from the first data set and the second data set, and storing at least one of the pairs extracted in a storage unit in a manner where their correspondence relationship is identifiable.

\* \* \* \* \*